UNITED STATES PATENT OFFICE.

CHARLES McKEE, OF SAN FRANCISCO, CALIFORNIA.

IMPROVED COMPOSITION FOR REMOVING INCRUSTATIONS FROM STEAM-BOILERS.

Specification forming part of Letters Patent No. 58,660, dated October 9, 1866.

*To all whom it may concern:*

Be it known that I, CHARLES MCKEE, of the city and county of San Francisco, State of California, have invented a new and useful Compound for Loosening or Removing Scale from Steam-Boilers, which I call "McKee's Boiler-Fluid;" and I do hereby declare that the following is a full and exact description thereof.

To enable others skilled in the art to make and use my invention, I will proceed to describe its composition and operation.

Take of camphor one and a half ounce; potash, one and a half ounce; ammonia, one-half ounce; alum, one-half ounce. Dissolve the same in water or spirits, and mix with one gallon of petroleum or its equivalent of oleaginous matter.

Operation: When the boiler is cleaned and ready for filling enter the man-hole and distribute the composition throughout its interior—say, about one gallon of composition to each and every one thousand gallons of boiler capacity—after which use the boiler as usual. The scale will be loosened so as to be easily removed without the injurious chiseling heretofore requisite. The boiler, flues, and all can be easily kept free. As often as the boiler is cleaned use the composition as above.

I do not confine myself to the exact proportions herein stated; but

I claim—

The combination of camphor, potash, ammonia, and alum with petroleum or other oleaginous matter, substantially as described, and for the uses and purposes hereinbefore set forth.

CHARLES McKEE.

Witnesses:
CHAS. R. BOND,
W. W. LAWTON.